(12) United States Patent
Wu et al.

(10) Patent No.: US 11,791,737 B2
(45) Date of Patent: Oct. 17, 2023

(54) CONTROL METHODS FOR CHANGING MINIMUM ON-TIME OF SYNCHRONOUS RECTIFIER AND RELATED SYNCHRONOUS RECTIFIER CONTROLLERS

(71) Applicant: Leadtrend Technology Corporation, Zhubei (TW)

(72) Inventors: Tsung-Chien Wu, Zhubei (TW); Chung-Wei Lin, Zhubei (TW); Ming-Chang Tsou, Zhubei (TW); Jun-Hao Huang, Zhubei (TW)

(73) Assignee: LEADTREND TECHNOLOGY CORPORATION, Zhubei (TW)

( * ) Notice: Subject to any disclaimer, the term of this patent is extended or adjusted under 35 U.S.C. 154(b) by 73 days.

(21) Appl. No.: 17/548,957

(22) Filed: Dec. 13, 2021

(65) Prior Publication Data
US 2022/0302850 A1 Sep. 22, 2022

(30) Foreign Application Priority Data

Mar. 18, 2021 (TW) ................. 110109822

(51) Int. Cl.
*H02M 3/335* (2006.01)

(52) U.S. Cl.
CPC ... *H02M 3/33592* (2013.01); *H02M 3/33507* (2013.01)

(58) Field of Classification Search
CPC ............ H02M 3/22; H02M 1/08; H02M 1/36; H02M 3/24; H02M 3/325; H02M 3/335; H02M 3/28; H02M 3/01; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/155; H02M 3/1582; H02M 1/4233; H02M 1/12; H02M 3/07; H02M 7/219; H02M 7/4815; H02M 1/0048; Y02B 70/1491

See application file for complete search history.

(56) References Cited

U.S. PATENT DOCUMENTS

| 6,944,034 | B1 * | 9/2005 | Shteynberg | ......... H02M 1/4258 363/21.13 |
| 9,787,191 | B2 * | 10/2017 | Barrenscheen | ..... H02M 1/4258 |
| 11,018,584 | B2 * | 5/2021 | Ruan | ..................... H02M 3/157 |
| 2016/0268907 | A1 * | 9/2016 | Chen | ................. H02M 3/33507 |

* cited by examiner

*Primary Examiner* — Jeffrey A Gblende
(74) *Attorney, Agent, or Firm* — McClure, Qualey & Rodack, LLP

(57) ABSTRACT

The invention discloses a control method in use of a synchronous rectifier controller, controlling a synchronous rectifier in a power supply supplying power a load. The synchronous rectifier is turned ON in response to a terminal signal of the synchronous rectifier. An ON-time of the synchronous rectifier is made not less than a minimum ON-time. A detection result in association with the load is provided, for determining the minimum ON-time. The minimum ON-time is a first period when the detection result indicates the load as a first load, and a second period, shorter than the first period, when the detection result indicates the load as a second load heavier than the first load.

15 Claims, 6 Drawing Sheets

CONTROL METHODS FOR CHANGING MINIMUM ON-TIME OF SYNCHRONOUS RECTIFIER AND RELATED SYNCHRONOUS RECTIFIER CONTROLLERS

CROSS-REFERENCE TO RELATED APPLICATION

This application claims priority to and the benefit of Taiwan Application Series Number 110109822 filed on Mar. 18, 2021, which is incorporated by reference in their entirety.

BACKGROUND

The present disclosure relates generally to synchronous rectifier controllers and control methods used therein, and, more particularly, to synchronous rectifier controllers that determine a minimum ON-time of a synchronous rectifier in response to a load of a power supply.

In switching-mode power supplies, rectifiers are normally embodied by diodes to provide direct-current power sources. Each diode, nevertheless, has an unavoidable forward voltage, which causes considerable amount of power consumption if the diode conducts large current going through, and would reduce conversion efficiency significantly. To improve power conversion efficiency, a synchronous rectifier under the control of a synchronous rectifier controller is introduced to replace a rectification diode. The synchronous rectifier is supposed to be turned ON and provides a very-low conduction resistance when the rectification diode, if not replaced, is forward biased. Similarly, it should be turned OFF to block any reverse current when the rectification diode, if not replaced, is reversely biased.

In addition to high power conversion efficiency, power supplies are required to have a compact size. As the volumes of power supplies keep shrinking, new technical issues emerge. For example, an inductor or a transformer always occupies a significant space in a power supply, and is usually prioritized to shrink first. An inductor with a smaller size nevertheless implies less inductance, requiring an associated switching mode power supply to operate at a higher switching frequency. It has become a need to correctly operate a synchronous rectifier at a higher switching frequency, because damage to power conversion efficiency occurs if the synchronous rectifier is not turned ON or OFF timely.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

A flyback power supply according to embodiments of the invention converts electric power from a primary side to a secondary side to supply power to a load. At the secondary side, the flyback power supply has a synchronous rectifier (SR) and a SR controller. In response to a terminal signal of the synchronous rectifier, the SR controller turns ON the synchronous rectifier, to start an ON-time. The ON-time is controlled not to be less than a minimum. ON-time. The SR controller further provides a detection result in association with the load, to adjust the minimum ON-time.

In one embodiment of the invention, the minimum ON-time is a first period if the detection result indicates that the flyback power supply is operating in a discontinuous conduction mode (DCM), and is a second period shorter than the first period if the detection result indicates that the flyback power supply might be operating in a continuous conduction mode (CCM). The load is light or does not exist when the flyback power supply is operating in a DCM, and is lighter than the load when the flyback power supply is operating in a CCM. Accordingly, the detection result is substantially in association with the load.

According to embodiments, the SR controller counts the number of times the terminal signal goes across a reference signal, to determine whether the flyback power supply is operating in a DCM. For example, if the number equals or exceeds 2, it is determined that the flyback power supply is currently operating in a DCM, and that the load is a first load. If the number is less than 2, the flyback power supply is operating in a DCM or a CCM, and the load is a second load heavier than the first load.

If the flyback power supply is possibly operating in a CCM, the minimum ON-time is set to be a second period, a shorter one. A shorter minimum. ON-time could prevent the scenario that both a power switch at the primary side of the flyback power supply and the synchronous rectifier at the second side are turned ON at the same time when the switching frequency of the flyback power supply is very high.

If the flyback power supply is surely operating in a DCM, the minimum ON-time is set to be a first period, a longer one in comparison with the second period. The first period could ensure the power controller at the primary side of the flyback power supply a sufficient time to detect an output voltage provided to the load at the secondary side, avoiding false output voltage detection.

Figure 1:
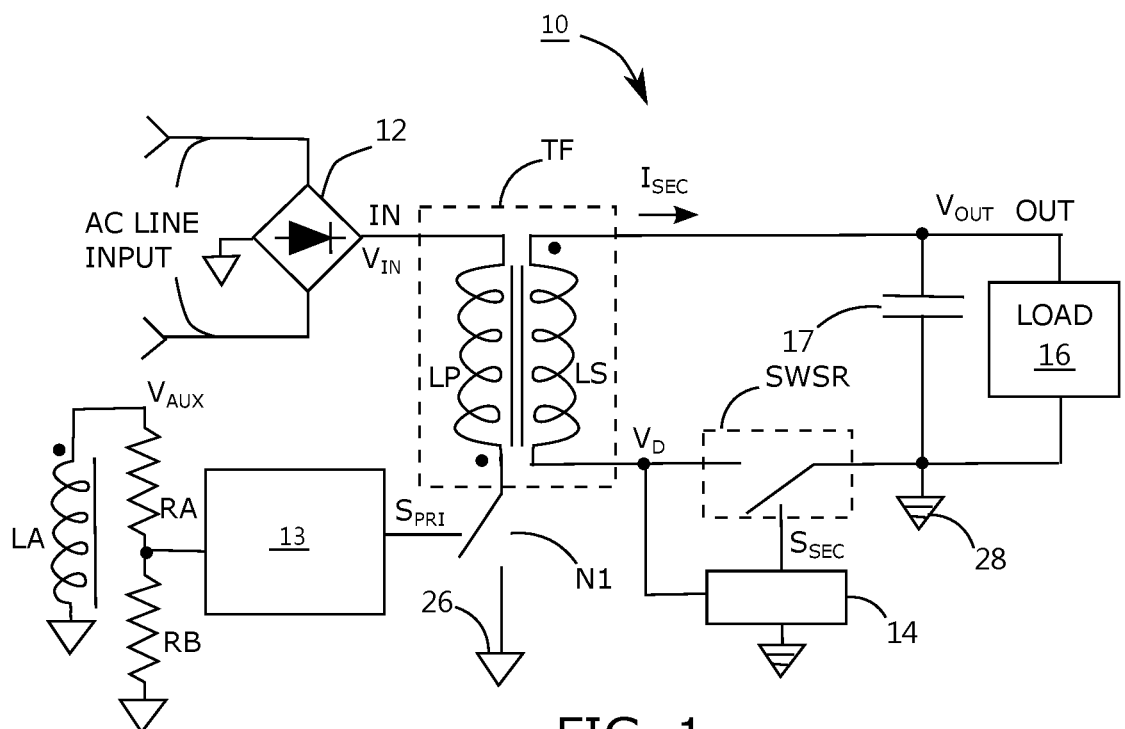
FIG. 1 demonstrates a flyback power supply according to embodiments of the invention.

FIG. 1 demonstrates flyback power supply 10 according to embodiments of the invention. Flyback power supply 10 includes, among others, bridge rectifier 12, transformer TF, power switch N1, power controller 13, output capacitor 17, synchronous rectifier SWSR, and SR controller 14. Transformer TF has primary winding LP and auxiliary winding LA at the primary side, and secondary winding LS at the secondary side, inductively coupling to one another.

Flyback power supply 10 is an AC-to-DC power supply, converting an alternating-current (AC) voltage from a power grid at the primary side into a direct-current (DC) output voltage $V_{OUT}$ at the secondary side to supply power to load 16. Bridge rectifier 12 provides full-wave rectification to the AC voltage, accordingly providing input voltage $V_{IN}$ at input power line IN and a ground voltage at input ground line 26, where the ground voltage is deemed as 0V referenced by the voltages at the primary side. Power controller 13 sends PWM signal $S_{PRI}$ to control power switch N1. When power switch N1 is turned ON, providing a short circuit, transformer TF energizes; when power switch N1 is turned OFF, providing an open circuit, transformer TF de-energizes and releases energy to build up output voltage $V_{OUT}$ across output capacitor 17, which supplies power to load 16.

SR controller 14 detects drain signal $V_D$ at the drain of synchronous rectifier SWSR, to determine whether transformer TF is de-energizing or de-magnetizing. For example, if drain signal $V_D$ has a voltage less than the voltage at the source of synchronous rectifier SWSR, transformer TF is seemingly de-energizing. When SR controller 14 determines that transformer TF is de-energizing, releasing the energy it stores, SR controller 14 turns ON synchronous rectifier SWSR, which accordingly provides a conductive path with a very low impedance to electrically connect the drain and the source of synchronous rectifier SWSR. Nevertheless, if SR controller 14 determines that transformer TF is not de-energizing, SR controller 14 would turn OFF synchronous rectifier SWSR to substantially disconnect the drain from the source. Therefore, synchronous rectification is implemented.

ON time $T_{SR-ON}$ refers to the time period when synchronous rectifier SWSR is turned ON; OFF time $T_{SR-OFF}$ the time period when it is turned OFF.

Power controller 13 detects, by way of series-connected resistors RA and RB, voltage drop $V_{AUX}$ across auxiliary winding LA. When transformer TF is de-energizing to buildup output voltage $V_{OUT}$, voltage drop $V_{AUX}$ substantially reflects output voltage $V_{OUT}$. Based on voltage drop $V_{AUX}$, power controller 13 modulates switching frequency or duty cycle of PWM signal $S_{PRI}$, to regulate output voltage $V_{OUT}$.

Figure 2:
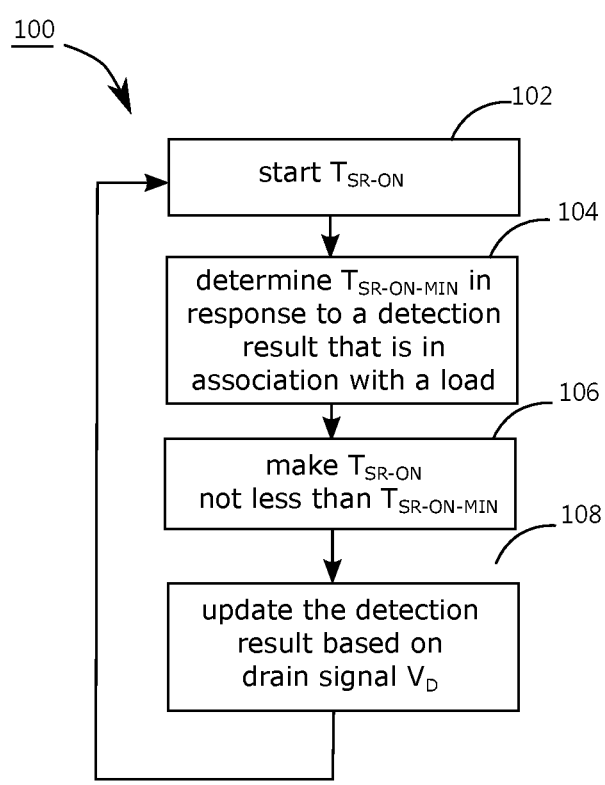
FIG. 2 shows a control method in use of a SR controller.

FIG. 2 shows control method 100 in use of SR controller 14, controlling synchronous rectifier SWSR.

At step 102, SR controller 14 turns ON synchronous rectifier SWST, so ON time $T_{SR-ON}$ starts. For example, SR controller 14 turns ON synchronous rectifier SWST if drain-to-source $V_{DS}$, the difference from drain signal $V_D$ to source signal $V_S$, drops quickly and deeply enough.

At step 104, SR controller 14 provides a detection result in association with load 16, and, based on the detection result, determines minimum ON-time $T_{SR-ON-MIN}$.

At step 106, SR controller 14 makes ON time $T_{SR-ON}$ not less than minimum ON-time $T_{SR-ON-MIN}$, which is the minimum of ON time $T_{SR-ON}$. The setup of minimum ON-time $T_{SR-ON-MIN}$ can prevent ineffective switching caused by too-short ON time $T_{SR-ON}$.

At step 108, SR controller 14 updates the detection result based on drain signal $V_D$. After step 108, control method 100 returns to step 102.

Figure 3A:
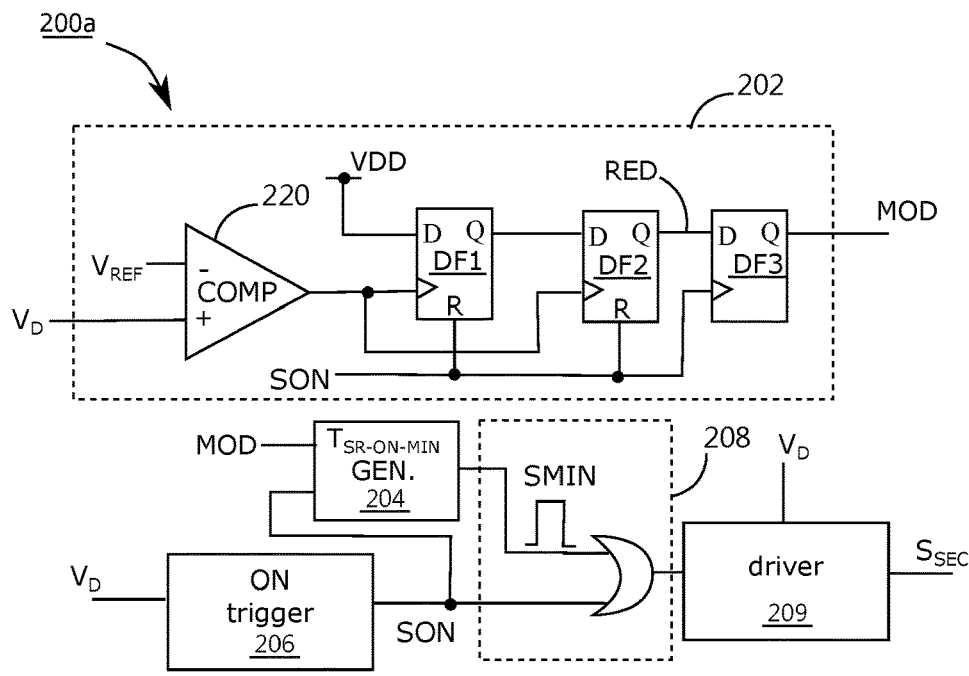
FIG. 3A demonstrates a SR controller.

FIG. 3A demonstrates SR controller 200a which according to embodiments of the invention replaces SR controller 14 of flyback power supply 10 in FIG. 1. SR controller 200a has, but is not limited to have, load estimator 202, ON trigger 206, minimum ON-time generator 204, logic 208, and driver 209.

ON trigger 206 detects drain signal $V_D$ at the drain of synchronous rectifier SWSR to determine whether transformer TF is de-energizing. For example, ON trigger 206 detects the voltage level of drain signal $V_D$ and the dropping rate of the voltage level. If, for instance, drain signal $V_D$ is less than −0.4V and the dropping rate exceeds a certain rate, ON trigger 206 determines that transformer TF is de-energizing, so it asserts signal SON, which goes through logic 208 and driver 209 and becomes signal $S_{SEC}$ to turn ON synchronous rectifier SWSR.

Minimum ON-time generator 204, upon receiving asserted signal SON, sends a pulse SMIN to logic 208, where the pulse width of pulse SMIN is minimum ON-time $T_{SR-ON-MIN}$, determined by detection result MOD. In one embodiment, minimum ON-time $T_{SR-ON-MIN}$ is a longer period $T_{MIN-B}$ when detection result MOD is "1" in logic; and a shorter period $T_{MIN-S}$ when detection result MOD is "0" in logic. Period $T_{MIN-B}$ is longer than period $T_{MIN-S}$.

ON trigger 206 also detects drain signal $V_D$ to determine whether transformer TF has depleted the energy it stores or the de-energization of transformer TF has come to an end. For example, ON trigger 206 determines the de-energization of transformer TF has completed if drain voltage $V_D$ turns positive, and accordingly ON trigger 206 de-asserted signal SON, which goes through logic 208 and driver 209 to turn OFF synchronous rectifier SWSR, concluding ON time $T_{SR-ON}$.

Logic 208 makes ON time $T_{SR-ON}$ not shorter than minimum ON-time $T_{SR-ON-MIN}$.

Figure 3B:
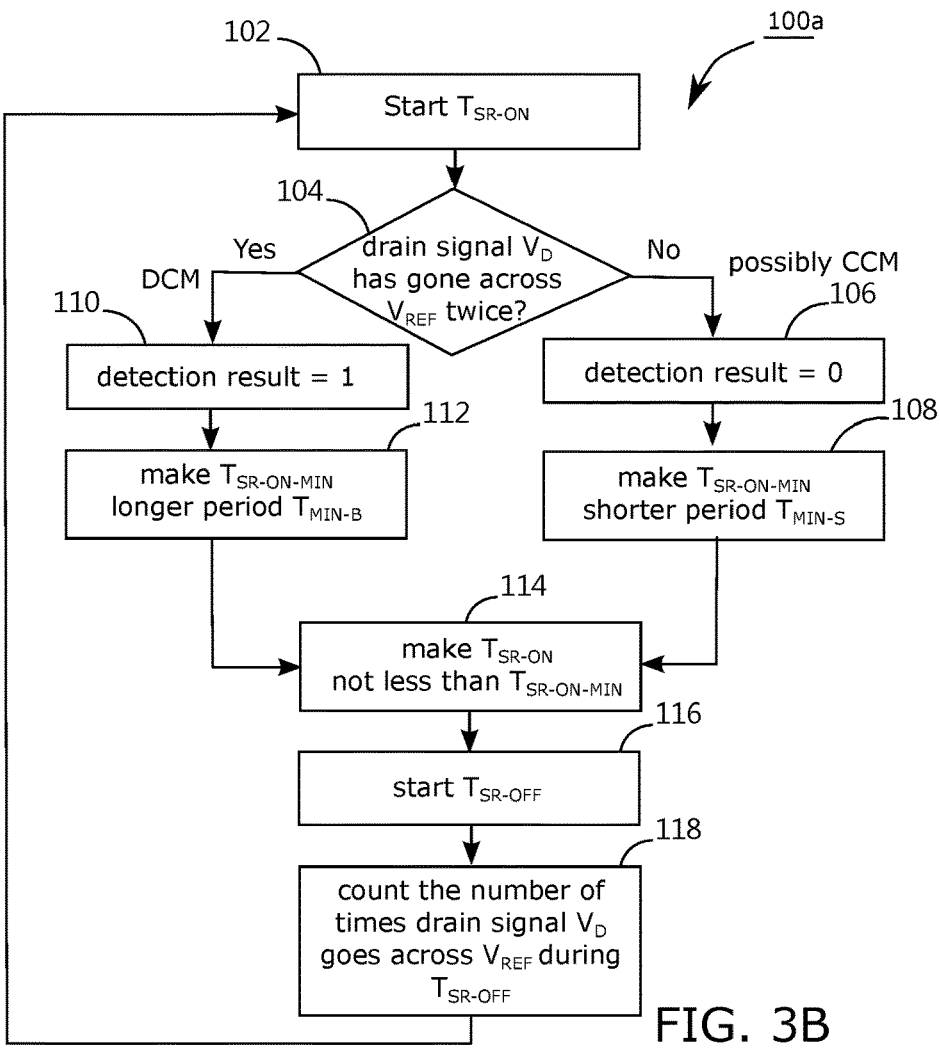
FIG. 3B demonstrates a control method.

Please refer to both FIGS. 3A and 3B, where FIG. 3B demonstrates control method 100a in use of SR controller 200a in FIG. 3A.

At step 102 in FIG. 3B, ON trigger 206 in FIG. 3A starts ON time $T_{SR-ON}$.

At step 104 in FIG. 3B, it is determined whether drain signal $V_D$ has gone across reference signal $V_{REF}$ twice during the last OFF time $T_{SR-OFF}$. In FIG. 3A, only if drain signal $V_D$ has gone across reference signal $V_{REF}$ at least twice during the last OFF time $T_{SR-OFF}$, can the two rising edges of the output from comparator 220 make D flip-flops DF1 and DF2 shift "1" in logic, and turn signal RED into "1" before ON time $T_{SR-ON}$ starts. Otherwise, signal RED always remains "0" before the beginning of ON time $T_{SR-ON}$ if drain signal $V_D$ has gone across reference signal $V_{REF}$ only once during the last OFF time $T_{SR-OFF}$. Therefore, the logic value of signal RED at the beginning of ON time $T_{SR-ON}$ tells whether drain signal $V_D$ has increased over reference signal $V_{REF}$ at least twice during an OFF time $T_{SR-OFF}$.

Step 110 follows if the answer in step 104 of FIG. 3B is positive, setting detection result MOD "1" in logic to indicate that flyback power supply 10 is operating in a DCM. Step 106 follows otherwise, setting detection result MOD "0" in logic to indicate that flyback power supply 10 might be operating in a CCM. In FIG. 3A, a rising edge of signal SON triggers D flip-flop DF3 in load estimator 202 to record the current value of signal RED, making detection result MOD equal to signal RED. It is possibly designed that load 16 is no load or a light load if flyback power supply 10 is operating in a DCM, and is a middle load or a heavy load of it is operating in a CCM.

At steps 112 and 108, detection result MOD determines minimum ON-time $T_{SR-ON-MIN}$. Minimum ON-time $T_{SR-ON-MIN}$ is a longer period $T_{MIN-B}$ when detection result MOD is "1" in logic; and a shorter period $T_{MIN-S}$ when detection result MOD is "0" in logic, where period $T_{MIN-B}$ is longer than period $T_{MIN-S}$.

Logic 208 performs step 114, making ON time $T_{SR-ON}$ not shorter than minimum ON-time $T_{SR-ON-MIN}$.

During ON time $T_{SR-ON}$, flip-flops DF1 and DF2 in FIG. 3A are reset by signal SON, to have outputs as logic "0".

Step 116 concludes ON time $T_{SR-ON}$ and starts OFF time $T_{SR-OFF}$.

Step 118 counts the number of times drain signal $V_D$ goes across reference signal $V_{REF}$, and this step is performed by the combination of comparator 220, and D flip-flops DF1 and DF2. Signal RED turns into "1" in logic only if the number equals or exceeds 2, or it remains "0" otherwise.

Figure 4A:
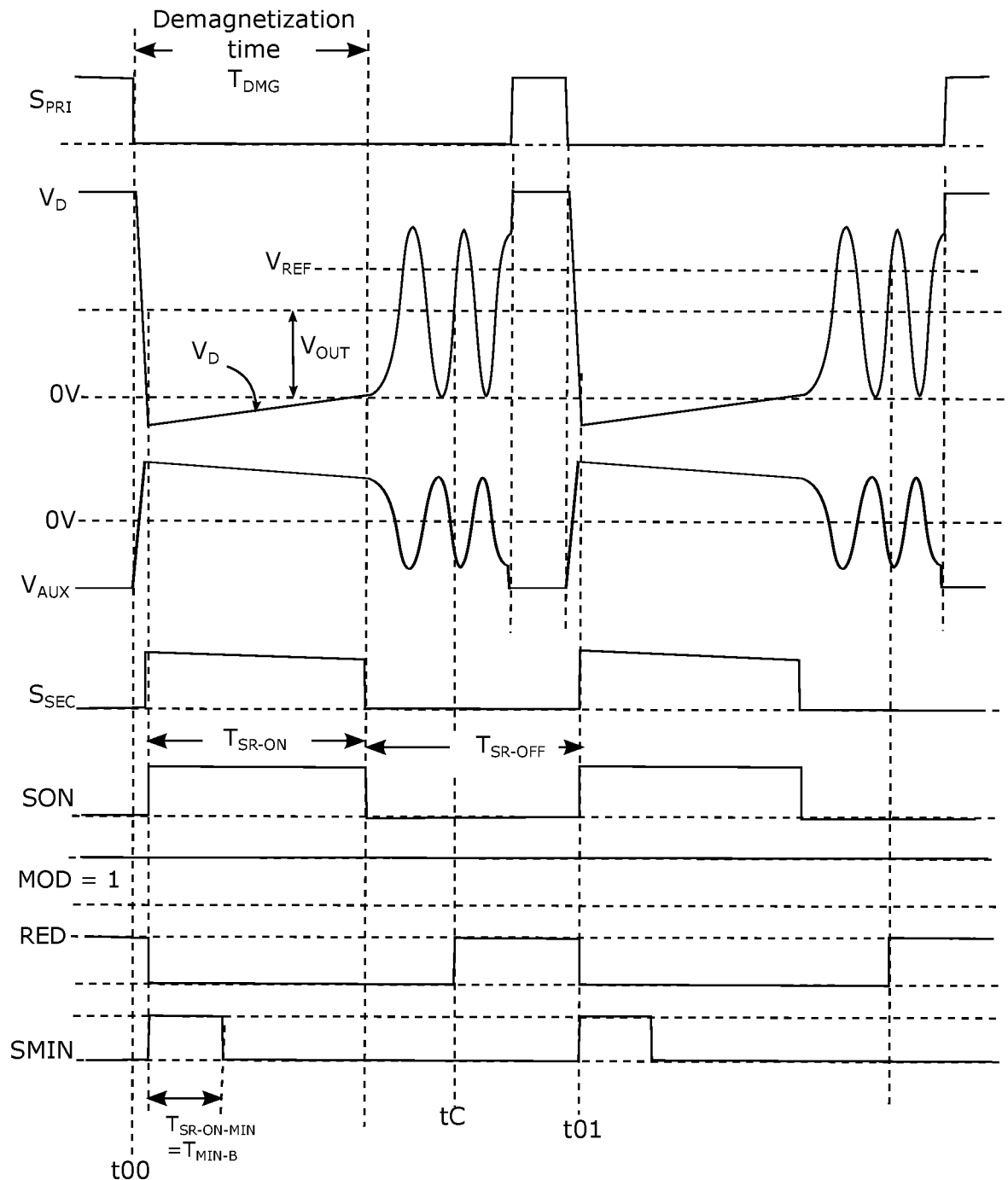
FIG. 4A shows some signal waveforms in the flyback power supply of FIG. 1 when the flyback power supply is operating in a DCM.

FIG. 4A shows some signal waveforms in flyback power supply 10 and SR controller 200a when flyback power supply is operating in a DCM.

At moment t00, PWM signal $S_{PRI}$ turns OFF power switch N1, starting demagnetization time $T_{DMG}$.

The initial value of signal RED at moment t00 can only affect the present switching cycle starting at moment t00 and will not influence the next switching cycle. It is assumed that signal RED is "1" in logic at moment t00.

As shown in FIG. 4A, ON trigger 206 asserts signal SON to turn ON synchronous rectifier SWSR when drain signal $V_D$ turns negative, starting ON time $T_{SR-ON}$, which is the duration when signal SON is "1" in logic.

In the beginning of ON time $T_{SR-ON}$, signal RED is used to update detection result MOD, which accordingly becomes "1" in logic, making minimum ON-time $T_{SR-ON-MIN}$ longer period $T_{MIN-B}$. At the same time, D flip-flops DF1 and DF2 are reset, so signal RED becomes "0" in logic.

OFF time $T_{SR-OFF}$ starts after ON time $T_{SR-ON}$ ends, and drain signal $V_D$ starts oscillating. At moment tC, drain signal $V_D$ exceeds reference signal $V_{REF}$ the second time, so signal RED becomes "1" in logic. OFF time $T_{SR-OFF}$ ends at moment t01, which is also the moment when drain signal $V_D$ turns negative the next time, representing the beginning of the next demagnetization time $T_{DMG}$.

As shown in FIG. 4A, flyback power supply 10 must be operating in a DCM if drain signal $V_D$ exceeds reference signal $V_{REF}$ twice during an OFF time $T_{SR-OFF}$ Accordingly, minimum ON-time $T_{SR-ON-MIN}$ is set to be longer period $T_{MIN-B}$.

Figure 4B:
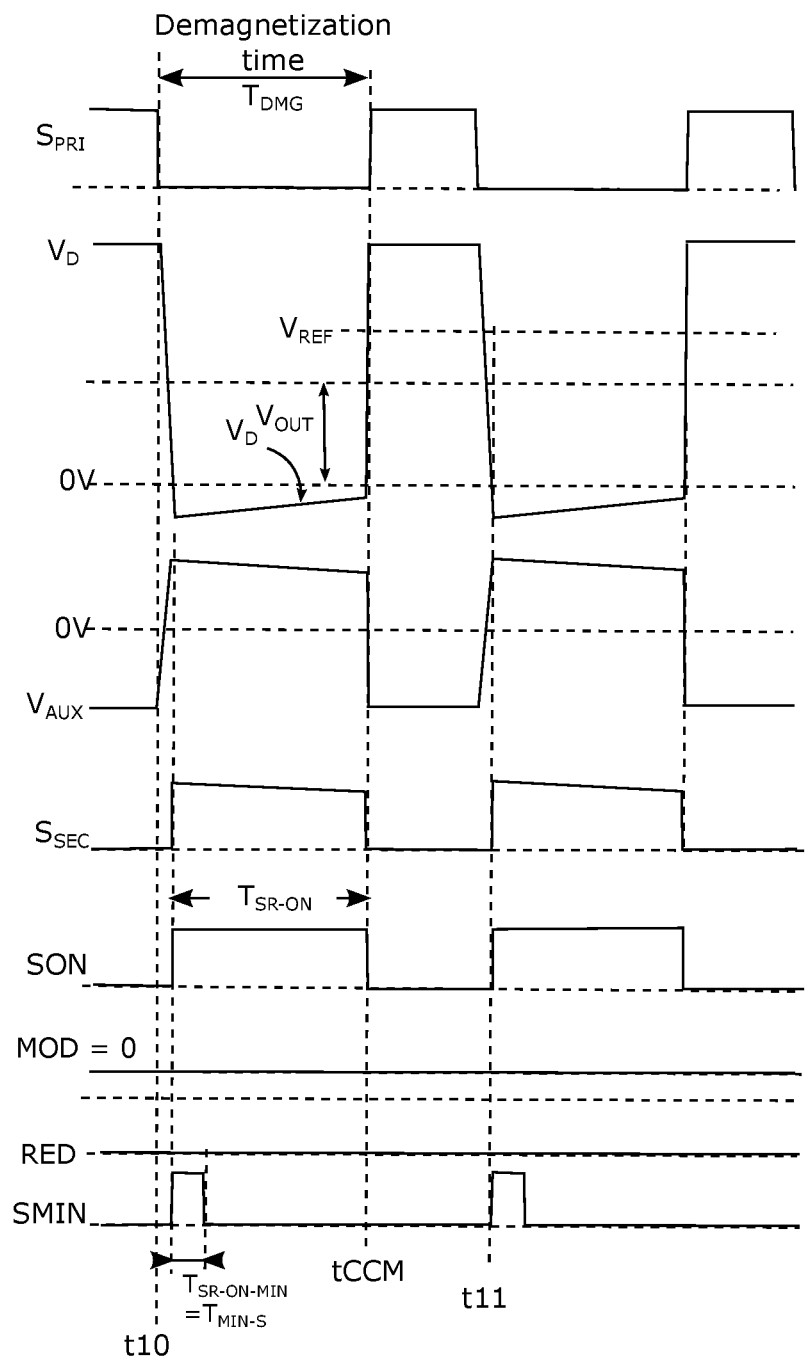
FIG. 4B shows some signal waveforms in the flyback power supply of FIG. 1 when the flyback power supply is operating in a CCM.

Analogously, FIG. 4B shows some signal waveforms in flyback power supply 10 and SR controller 200a when flyback power supply is operating in a CCM. The similar or the same aspects between FIGS. 4B and 4A are not explained hereinafter because they are comprehensible in view of the previous teachings.

In FIG. 4B, it is supposed signal RED is "0" at moment t10. Therefore, in the beginning of ON time $T_{SR-ON}$, since signal RED is used to update detection result MOD, detection result MOD accordingly becomes "0" in logic, making minimum ON-time $T_{SR-ON-MIN}$ shorter period $T_{MIN-S}$. At the same time, D flip-flops DF1 and DF2 are reset, so signal RED becomes "0" in logic.

At moment tCCM in FIG. 4B when drain signal $V_D$ is still negative, PWM signal $S_{PRI}$ turns ON power switch N1, so drain signal $V_D$ is abruptly pulled up by force, concluding both demagnetization time $T_{DMA}$ and ON time $T_{SR-ON}$. Apparently shown in FIG. 4B, flyback power supply is operating in a CCM, because transformer TF has not completely depleted or released the energy it stores before transformer TF energizes again.

At moment t11, another ON time $T_{ER-ON}$ starts. Obviously shown in FIG. 4B, during the switching cycle from moment t10 to moment t11, drain signal $V_D$ goes above reference signal $V_{REF}$ merely once at moment tCCM. FIG. 4B demonstrates that flyback power supply 10 might operate in a CCM if drain signal $V_D$ rises above reference signal $V_{REF}$ only once. Therefore, both signal RED and detection result MOD remain "0" at moment t11, and minimum ON-time $T_{SR-ON-MIN}$ is shorter period $T_{MIN-S}$.

Operating in a CCM could indicate that load 16 is a middle load or a heavy load, and, according to embodiments of the invention, minimum ON-time $T_{SR-ON-MIN}$ is set to be shorter period $T_{MIN-S}$ to prevent the scenario that power switch N1 is turned ON when synchronous rectifier SWSR is still forced to be ON by minimum ON-time $T_{SR-ON-MIN}$. That scenario seems like a short circuit formed between two power lines with different voltages, and could cause huge detrimental current surge through transformer TF. Shorter period $T_{MIN-S}$ could help synchronous rectifier SWSR turned OFF earlier than the moment when power switch N1 is turned ON.

Operating in a DCM could indicate that load 16 is a light load or a no load, and, according to embodiments of the invention, minimum ON-time $T_{SR-ON-MIN}$ is set to be longer period $T_{MIN-B}$, to provide a longer time period that power controller 13 at the primary side can detect output voltage $V_{OUT}$ remotely and accurately. In case that flyback power controller 10 uses primary-side regulation, it is necessary for power controller 13 to detect output voltage $V_{OUT}$ by detecting voltage drop $V_{Aux}$ across auxiliary winding LA during ON time $T_{SR-ON}$ If load 16 is no load and minimum ON-time $T_{SR-ON-MIN}$ is over short, ON time $T_{SR-ON}$ might end quite early when power controller 13 has not completed the required output voltage detection. Accordingly power controller 13 could obtain false information of output voltage $V_{OUT}$, and the regulation of output voltage $V_{OUT}$ might fail. Longer period $T_{MIN-B}$ nevertheless, lengthens minimum ON-time $T_{SR-ON-MIN}$, giving more time for power controller 13 to obtain accurate information about output voltage $V_{OUT}$, so better output voltage regulation can be expected.

Load estimator 202 in FIG. 3A is a mere example to identify whether flyback power supply 10 is operating in a DCM, to roughly estimate the condition of load 16, and to determine minimum ON-time $T_{SR-ON-MIN}$ If load 16 is seemingly light, minimum ON-time $T_{SR-ON-MIN}$ is set to be longer period $T_{MIN-B}$ and if load 16 is seemingly heavy, it is set to be shorter period $T_{MIN-S}$. The invention is not limited to load estimator 202 however. Some embodiments of the invention could roughly determine the condition of load 16 by means other than load estimator 202, to accordingly determine minimum ON-time $T_{SR-ON-MIN}$.

Figure 5:
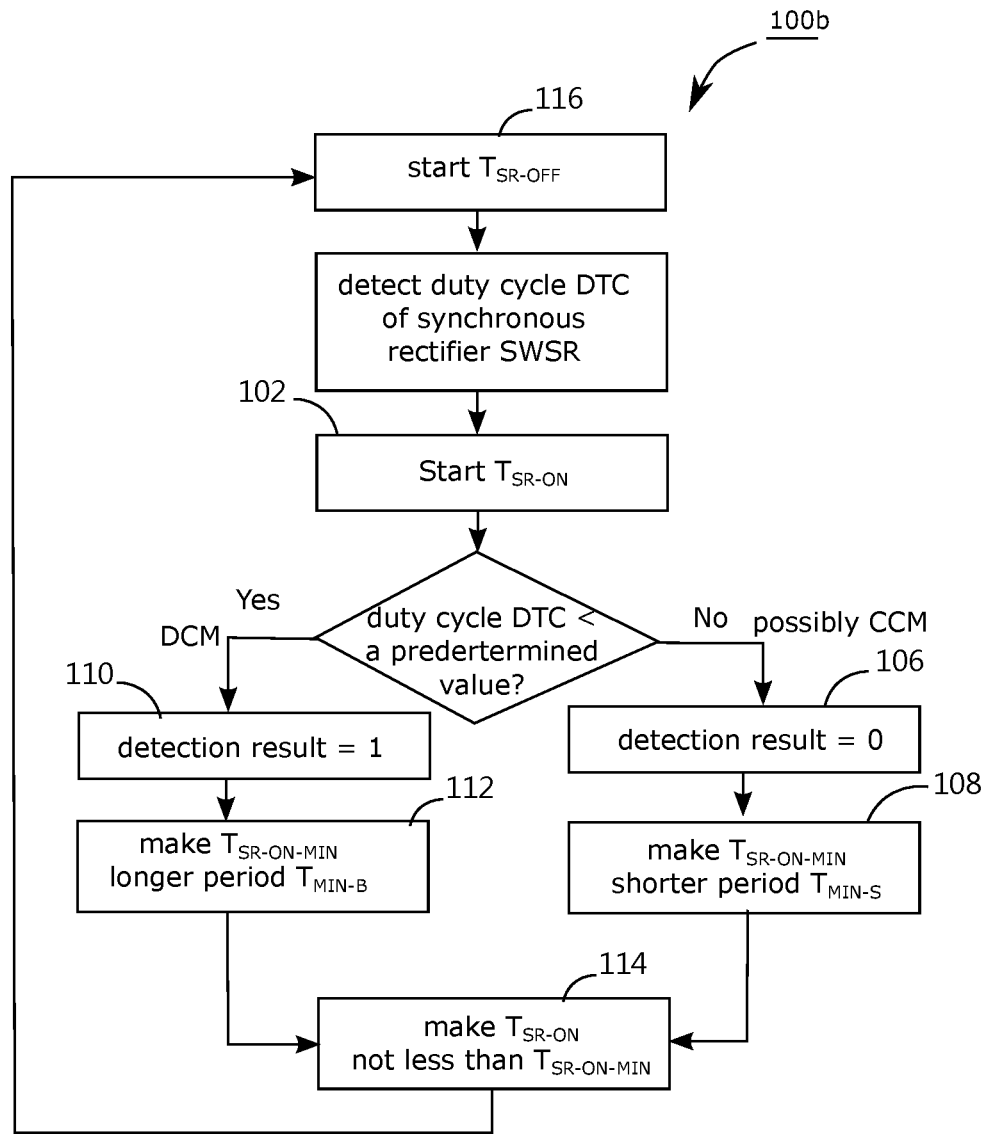
FIG. 5 shows another control method.

FIG. 5 shows control method 100b in use of SR controller 14, controlling synchronous rectifier SWSR. The similar or the same aspects between FIGS. 5 and 3B are not explained hereinafter because they are comprehensible in view of the previous teachings. Control method 100b calculates duty cycle DTC based on signal SON or signal $S_{SEC}$, where duty cycle DTC equals to ON time $T_{SR-ON}$ divided by a switching cycle consisting of an ON time $T_{SR-ON}$ and an OFF time $T_{SR-OFF}$ If duty cycle DTC is low, or below a predetermined value, load 16 is light possibly, so control method 100b makes minimum ON-time $T_{SR-ON-MIN}$ longer period $T_{MIN-B}$. On the other hand, if duty cycle DTC is high, or more than the predetermined value, load 16 is heavy possibly, so control method 100b makes minimum ON-time $T_{SR-ON-MIN}$ shorter period $T_{MIN-S}$ In other words, a load estimator could generate a detection result based on duty cycle DTC of synchronous rectifier SWSR, to determine minimum ON-time $T_{SR-ON-MIN}$.

Some embodiments of the invention detect a switching cycle of synchronous rectifier SWSR to roughly estimate the condition of load 16, where the switching cycle consists of an ON time $T_{SR-ON}$ and an OFF time $T_{SR-OFF}$. For instance, if the switching cycle is quite long, or more than a predetermined period, load 16 is light possibly, so minimum ON-time $T_{SR-ON-MIN}$ is set to be longer period $T_{MIN-B}$. On the other hand, if the switching cycle is quite short, or less than the predetermined period, load 16 is heavy possibly, so minimum ON-time $T_{SR-ON-MIN}$ is set to be shorter period $T_{MIN-S}$ In other words, a load estimator could generate a detection result based on the switching cycle of synchronous rectifier SWSR, to determine minimum ON-time $T_{SR-ON-MIN}$.

Some embodiments of the invention detect the rising slope of drain signal $V_D$ right after the end of ON time $T_{SR-ON}$ to roughly estimate the condition of load 16. If drain signal $V_D$ is rising up because of the turning ON of power switch N1 after the end of ON time $T_{SR-ON}$ implying a CCM, the rising slope will be very sharp. If drain signal $V_D$ goes up after the end of ON time $T_{SR-ON}$ due to the exhaustion of the stored power in transformer IF, implying a DCM, the rising slope will be much slower in comparison with the rising slope when operating in a CCM. For instance, if the rising slope is slow, or less than a predetermined speed, the operation mode could be a DCM and load 16 is light possibly, so minimum ON-time $T_{SR-ON-MIN}$ is set to be longer period $T_{MIN-B}$. On the other hand, if the rising slope is quick, or more than the predetermined speed, the operation mode could be a CCM and load 16 is heavy possibly, so minimum ON-time $T_{SR-ON-MIN}$ is set to be shorter period $T_{MIN-S}$. In other words, a load estimator could generate a detection result based on the rising slope of drain signal $V_D$, to determine minimum ON-time $T_{SR-ON-MIN}$.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control method of a synchronous rectifier controller, for controlling a synchronous rectifier in a power supply supplying power to a load, the control method comprising:
   providing a minimum ON-time;
   turning ON the synchronous rectifier in response to a terminal signal of the synchronous rectifier;
   making an ON-time of the synchronous rectifier not less than the minimum ON-time;
   providing a detection result in association with the load; and
   determining the minimum ON-time in response to the detection result;
   wherein the minimum ON-time is a first period when the detection result indicates the load as a first load, the minimum ON-time is a second period when the detection result indicates the load as a second load heavier than the first load, and the second period is shorter than the first period.

2. The control method as claimed in claim 1, comprising:
   counting a number of times the terminal signal goes across a reference signal;
   making the minimum ON-time the first period if the number exceeds a first predetermined number; and
   making the minimum ON-time the second period if the number is less than the first predetermined number.

3. The control method as claimed in claim 2, comprising:
   resetting the number when the synchronous rectifier is turned ON; and
   counting the number when the synchronous rectifier is turned OFF.

4. The control method as claimed in claim 1, wherein the detection result is provided based on a switching cycle of the synchronous rectifier.

5. The control method as claimed in claim 1, wherein the detection result is provided based on a duty cycle of the synchronous rectifier.

6. The control method as claimed in claim 1, wherein the detection result is provided based on a rising slope of the terminal signal.

7. A control method of a synchronous rectifier controller, for controlling a synchronous rectifier in a power supply supplying power to a load, the control method comprising:
   providing a minimum ON-time;
   turning ON the synchronous rectifier in response to a terminal signal of the synchronous rectifier;
   making an ON-time of the synchronous rectifier not less than the minimum ON-time;
   detecting whether the power supply operates in a discontinuous conduction mode;
   making the minimum ON-time a first period if the power supply operates in the discontinuous conduction mode; and
   making the minimum ON-time a second period shorter than the first period if the power supply does not operate in the discontinuous conduction mode.

8. The control method as claimed in claim 7, comprising:
   counting a number of times the terminal signal goes across a reference signal, to detect whether the power supply operates in the discontinuous conduction mode.

9. The control method as claimed in claim 7, comprising:
   detecting a rising slope of the terminal signal, to detect whether the power supply operates in the discontinuous conduction mode.

10. A synchronous rectifier controller controlling a synchronous rectifier in a power supply supplying power to a load, the synchronous rectifier controller comprising:
    an ON trigger circuit for turning ON the synchronous rectifier in response to a terminal signal of the synchronous rectifier;
    a load estimator, for providing a detection result in association with the load;
    a minimum ON-time generator for determining a minimum ON-time in response to the detection result; and
    a logic circuit making a ON-time of the synchronous rectifier not less than the minimum ON-time;
    wherein the minimum ON-time generator makes the minimum ON-time a first period when the detection result indicates the power supply operates in a discontinuous conduction mode, and a second period shorter than the first period when the detection result indicates the power supply operates in a continuous conduction mode.

11. The synchronous rectifier controller as claimed in claim 10, wherein the load estimator counts a number of times the terminal signal goes across a reference signal, and the minimum ON-time generator determines the minimum ON-time in response to the number and a predetermined value.

12. The synchronous rectifier controller as claimed in claim 11, wherein the load estimator counts the number when the synchronous rectifier is turned OFF, and resets the number when the synchronous rectifier is turned ON.

13. The synchronous rectifier controller as claimed in claim 10, wherein the load estimator provides the detection result based on a duty cycle of the synchronous rectifier.

14. The synchronous rectifier controller as claimed in claim 10, wherein the load estimator provides the detection result based on a switching cycle of the synchronous rectifier.

15. The synchronous rectifier controller as claimed in claim 10, wherein the load estimator provides the detection result based on a rising slope of the terminal signal.

* * * * *